(12) United States Patent
Bakker

(10) Patent No.: US 6,348,104 B1
(45) Date of Patent: Feb. 19, 2002

(54) DEVICE AND METHOD FOR CLEANING AQUARIUM WINDOWS

(75) Inventor: Gerardus Henricus Bakker, Riethoven (NL)

(73) Assignee: Bakker Holding Son B.V. (NL)

( * ) Notice: Subject to any disclaimer, the term of this patent is extended or adjusted under 35 U.S.C. 154(b) by 0 days.

(21) Appl. No.: 09/787,260

(22) PCT Filed: Jan. 4, 2000

(86) PCT No.: PCT/NL00/00004

§ 371 Date: Jun. 25, 2001

§ 102(e) Date: Jun. 25, 2001

(87) PCT Pub. No.: WO00/40080

PCT Pub. Date: Jul. 13, 2000

(51) Int. Cl.⁷ .................................................. B08B 9/04
(52) U.S. Cl. ......................... 134/6; 134/8; 134/22.1; 134/42; 15/220.2; 15/245; 119/264
(58) Field of Search ........................ 134/6, 8, 22.1, 134/42; 15/220.2, 245; 119/264

(56) References Cited

U.S. PATENT DOCUMENTS

| | | | | |
|---|---|---|---|---|
| 2,507,559 A | * | 5/1950 | D-andrea | 15/220 |
| 2,634,444 A | * | 4/1953 | Coleman | 15/121 |
| 3,208,090 A | * | 9/1965 | Roesel, Jr. | 15/220 |
| 4,921,614 A | * | 5/1990 | Frickman et al. | 210/695 |
| 4,977,637 A | | 12/1990 | Demers | 15/220.2 |
| 5,515,570 A | | 5/1996 | Muscroft | 15/104 R |
| 5,988,109 A | * | 11/1999 | Rofen | 119/245 |
| 6,502,978 | * | 3/2001 | Tsui | 134/8 |

FOREIGN PATENT DOCUMENTS

GB                2105977           4/1983

\* cited by examiner

*Primary Examiner*—Sharidan Carrillo
(74) *Attorney, Agent, or Firm*—Connolly Bove Lodge & Hutz LLP

(57) ABSTRACT

A device and method for cleaning the interior window surface of an aquarium comprises a buoyant floatable interior element and an exterior element. At least one element has at least one magnet and the other element has a material attracted to the at least one magnet so the elements attract each other under the influence of a magnetic force between the elements. Such material may be a magnet or magnetically attractive metal. Movement of the exterior element along the exterior window surface of the aquarium causes the buoyant floating interior element to move along the interior window surface of the aquarium thereby cleaning the interior window surface. Once the magnetic force between the elements has been removed, the buoyant floatable interior element floats to and on the surface of the liquid medium present in the aquarium.

10 Claims, 2 Drawing Sheets

DEVICE AND METHOD FOR CLEANING AQUARIUM WINDOWS

BACKGROUND OF THE INVENTION

The present invention relates to a device for cleaning aquarium windows, in particular the inside thereof, comprising an interior element, which is to be placed on the inside of the aquarium window, as well as an exterior element, which is to be placed on the outside of the aquarium window, which interior and exterior elements attract each other under the influence of magnetic force, so that movement of the exterior element along the aquarium window causes the interior element to follow this movement. The present invention furthermore relates to a method for cleaning aquarium windows, in particular the inside thereof, using two elements fitted with magnets.

A device and method of this kind for cleaning the inside of aquarium windows, using magnets, is known from British patent application No. 2,105,977. The apparatus disclosed therein comprises an interior device having a permanent magnetic field and a pair of cleaning faces substantially perpendicular to each other, and an exterior device having a permanent magnetic field for manipulating the interior device. When apparatus of this kind is used, the interior device is placed on the inside of the aquarium window, after which the exterior device is placed on the outside on the aquarium window, with the magnetic forces causing the two devices to "stick" to the aquarium window. When the exterior device is moved along the aquarium window, the interior device will follow the movements of the exterior device and thus clean the inside of the aquarium window. A drawback of such apparatus is the fact that when the magnetic contact is broken, the interior device will sink to the bottom of the aquarium, so that it will have to be removed therefrom by means of a scoop net or by hand. Another important drawback is the fact that when such a method of cleaning aquarium windows is used, the interior device must be pressed against the inside of the aquarium window by hand, whilst at the same moment the exterior device must be placed against the outside of the aquarium window, which makes it necessary for the upper side of the window to be readily and easily accessible. In many aquariums a cover plate is present on the upper side of the aquarium, however, so that the placing of the interior device is not an easy operation, which considerably increases the risk of the interior device suddenly becoming detached and thus sinking to the bottom.

The use of magnetic forces for cleaning windows, using a window cleaner having magnets, is also known from Netherlands patent application 8700802. The window cleaner known from said publication is especially suitable for cleaning windows of a building on the outside, which windows cannot be reached from ground level or from an upper floor. The problem that has been observed by the present applicant, that is, the sinking to the bottom of an element suitable for cleaning windows, is not known therefrom, and accordingly a window cleaner as disclosed in said publication does not provide the solution for the problem observed by the present applicant.

U.S. Pat. No. 5,515,570 relates to a manually operated window wiper, which document does not describe the problem observed by the present applicant, viz. the sinking to the bottom of the element suitable for cleaning windows. U.S. Pat. No. 4,977,637 furthermore discloses a magnetic window cleaning apparatus wherein a suction cup is connected via a hose to the window cleaning. apparatus so as to prevent the latter from becoming detached from the window to be cleaned.

Although devices for cleaning aquarium windows are known from U.S. Pat. No. 4,571,766, European patent application No. 0 527 580 and U.S. Pat. No. 5,601,322, such devices are not fitted with one or more magnets.

SUMMARY OF THE INVENTION

The object of the present invention is to overcome the above problems.

Another object of the present invention is to provide a method which makes it possible to clean the inside of aquarium windows quickly and efficiently in a simple manner.

Another object of the present invention is to provide a device for cleaning aquarium windows, which device can be produced by means of a simple production method.

The device as referred to in the introduction is according to the present invention characterized in that the interior element is so constructed that, once the magnetic force has been removed, the interior element will remain afloat on the liquid medium that is present in the aquarium.

Since the element to be placed on the inside of the aquarium, which element can be considered to be the interior element hereafter, is designed to have buoyancy, said element will not sink to the bottom upon removal of the magnetic force. When for example the magnetic force between the interior element and the element to be placed on the outside of the aquarium window, which element can be considered to be the exterior element hereafter, is removed, the interior element will rise to the surface of the liquid, after which the floating interior element can be drawn towards the aquarium window through manipulation of the exterior element, so that a close contact between the exterior and interior elements is established again. Since liquid flows occur inside the aquarium, there will always be a moment when the interior element floating on the liquid is located within the magnetic field of the element present on the outside of the aquarium window, so that the contact between the two elements can be reestablished.

In a special embodiment of the present invention it is preferable to design the device so that it comprises an air chamber which is to give the interior element buoyancy.

The presence of air in the element to be placed on the inside of the aquarium window ensures that the interior element will rise to the liquid surface upon removal of the magnetic force rather than sink to the bottom.

In another preferred embodiment of the present invention it is preferable with a view to obtaining buoyancy that the element to be placed on the inside of the aquarium window includes a material which has a density lower than that of the liquid medium which is present in the aquarium.

Suitable materials are for example plastic, foam, wood and the like, whereby it is of course important in view of the buoyancy thereof that the density of the eventual element to be placed on the inside of the aquarium window is lower than the density of the liquid medium which is present in the aquarium, so that the buoyancy is ensured. When such a material is used, a leak in the air chamber of the interior element, for example, which allows water to penetrate into the interior element, will not cause the interior element to sink to the bottom.

It is in particular preferable that both the element to be placed on the inside of the aquarium window and the element to be placed on the outside of the aquarium window are fitted with one or more magnets.

By fitting both elements with magnets, a strong connection between the two elements is ensured, which connection is in particular very important when very thick aquarium windows are to be cleaned. A powerful magnetic field is also required when the interior element is to clean the aquarium windows near the bottom of the aquarium, because the force exerted on the interior element is considerably larger there than near the liquid surface. Moreover, by using magnets in both elements the magnetic contact will not easily be broken, which is very important when cleaning round certain obstacles, such as pumps, water plants, decorative stones.

In a special embodiment of the present invention it is desirable for the interior element to include a material which can be attracted by a magnetic field rather than being fitted with the magnets as described above.

The interior element of such an embodiment may for example include an iron plate or any other material which is capable of being attracted by magnetic forces. A considerable saving in weight can be achieved by using such a material instead of magnets. In addition, a cost reduction can be achieved in this manner.

In order to obtain a good cleaning effect while using the element to be placed on the inside of the aquarium window, it is in particular preferable for said element to comprise a rough surface on the side parallel to the aquarium window.

As a result of the provision of a rough surface, the aquarium window, on which dirt is present, can easily be cleaned by moving the rough surface of the interior element along said window. A rough surface can for example be obtained by providing the interior element with a scale-like or grid-like structure. Such a structure can be obtained by means of an injection moulding process, using a mould of simple design.

In order to prevent the outside of the aquarium window from becoming scratched, the element to be placed on the outside of the aquarium window preferably has a smooth surface on the side parallel to the aquarium window. Such a smooth surface of the exterior element can for example be obtained by using a felt-like material.

The present invention furthermore relates to a method for cleaning aquarium windows, in particular the inside thereof, using an interior element, which is to be placed on the inside of the aquarium window, and an exterior element, which is to be placed on the outside of the aquarium window, which elements attract each other under the influence of magnetic force, wherein the exterior element is moved along the aquarium window and the interior element follows said movement under the influence of the magnetic force, which method is characterized in that the device as described above is used.

BRIEF DESCRIPTION OF THE DRAWINGS

The present invention will now be explained in more detail by means of an example, wherein reference is made to the appended drawings, whereby it should be noted, however, that variations and modifications are possible within the scope of the appended claims without departing from the essence of the present invention.

DETAILED DESCRIPTION OF THE INVENTION

Figures 1, 2:
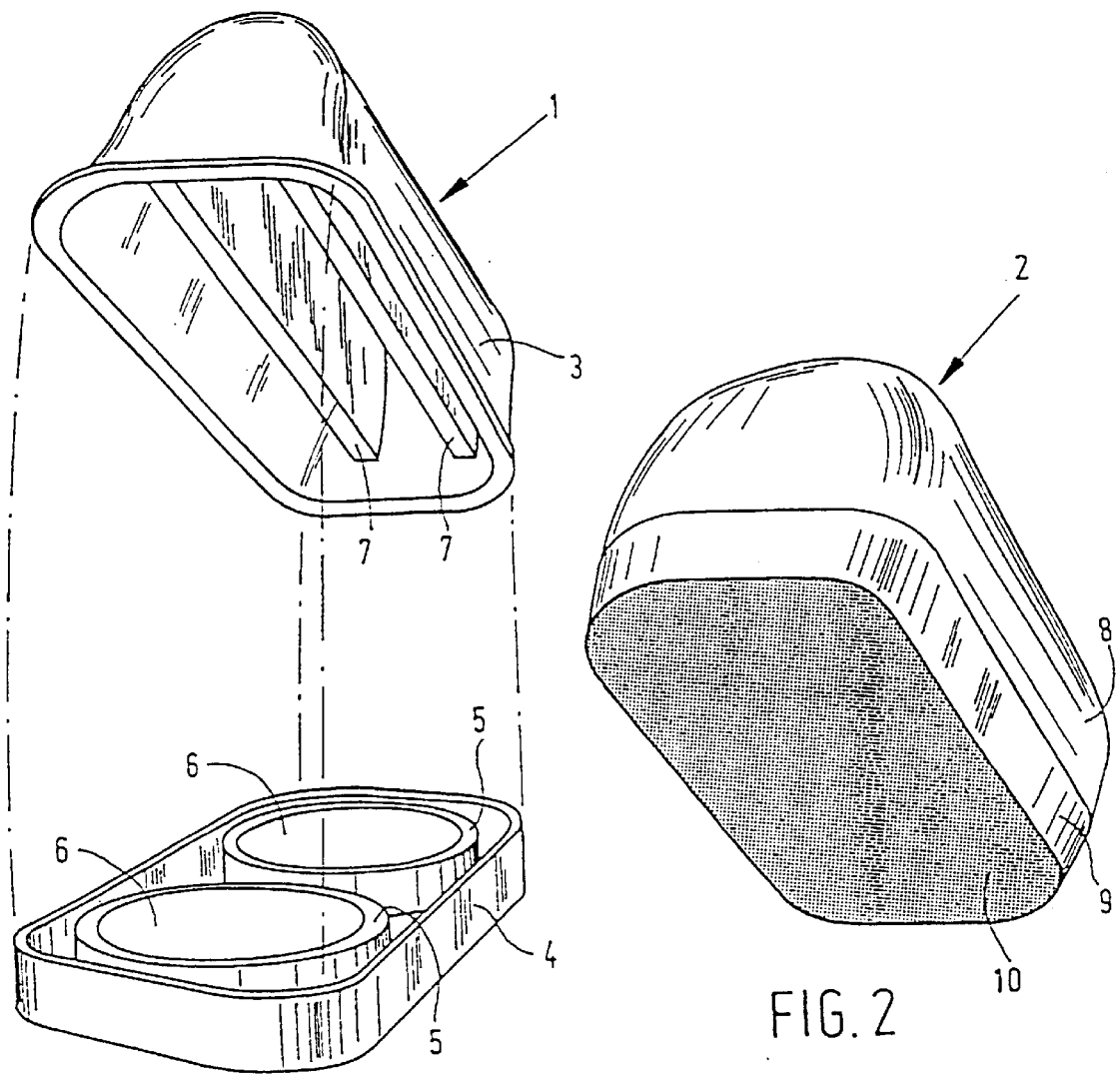
FIG. 1 schematically shows the element according to the invention that is to be placed on the inside of the aquarium window.
FIG. 2 schematically shows the element according to the invention that is to be placed on the outside of the aquarium window.

FIG. 1 schematically shows the interior element 1, which interior element 1 in particular comprises a segment 3 and a segment 4, which segment 3 can be clamped down on segment 4. Segment 4 is furthermore provided with one or more recesses 5, into which one or more magnets 6 can be placed. One or more stiffening plates are provided in segment 3 for the purpose of stiffening said segment. By placing segment 3 onto segment 4, an interior element 1 is obtained which will remain afloat in the liquid medium present in the aquarium, due to the presence of the air chamber enclosed by segment 3 and segment 4. The bottom plate (not shown) of segment 4 has a rough surface so as to provide a cleaning effect.

FIG. 2 schematically shows the exterior element 2. Said exterior element 2 in particular comprises two segments 8 and 9, which segments 8, 9 can be clamped together. Preferably, segment 9 comprises one or more recesses (not shown), in which one or more magnets (not shown) are present. Such recesses may for example correspond to the aforesaid recesses 5 that are shown in FIG. 1. In order to prevent the bottom plate 10 of segment 9, which bottom plate 10 abuts against the outside of the aquarium window, from making scratches on said window, bottom plate 10 preferably has a smooth surface, which is for example obtained by using a felt-like material. Although the description of interior element 1 and exterior element 2 mentions the presence of one or more magnets 6 in segment 4 as well as in segment 9, it is desirable in a specific embodiment that only one of the segments 4, 9 contains one or more magnets, with the other segment including a material which is capable of being attracted by a magnetic field. Although the buoyancy of the element 1 to be placed on the inside of the aquarium window is provided by an air chamber enclosed by segment 3 and segment 4 in FIG. 1, it should be understood that the provision of such buoyance is not limited thereto. Thus it is desirable in specific embodiments to form interior element 1 of a material such that interior element 1 has a density lower than that of the liquid medium in the aquarium. Thus it is possible to form interior element 1 of a foam material, for example, so that possible leakage of air, for example via the joint between segment 3 and segment 4, due to damage or poor adhesion will not cause the interior element 1 to sink to the bottom yet. Although two circular recesses 5 are used in FIG. 1, it should be apparent that the present invention is not limited thereto and that any number of recesses 5 and any geometric form can be used.

Figure 3:
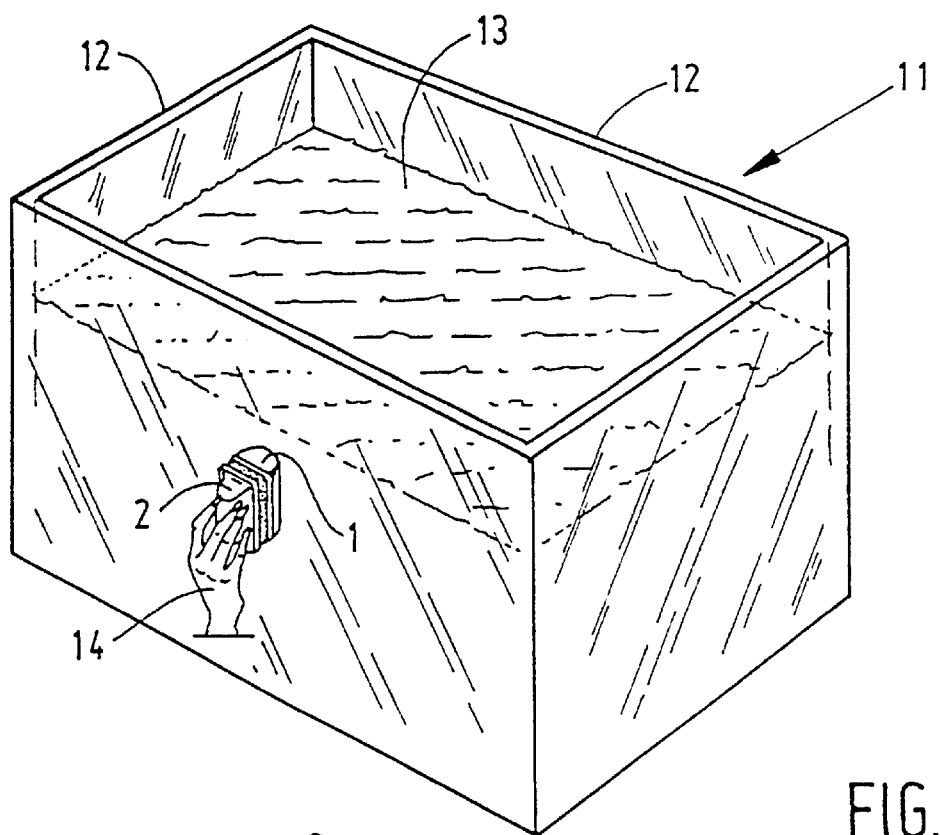
FIG. 3 schematically shows the situation in which the device as well as the method according to the present invention are used for cleaning aquarium windows.
Figure 4:
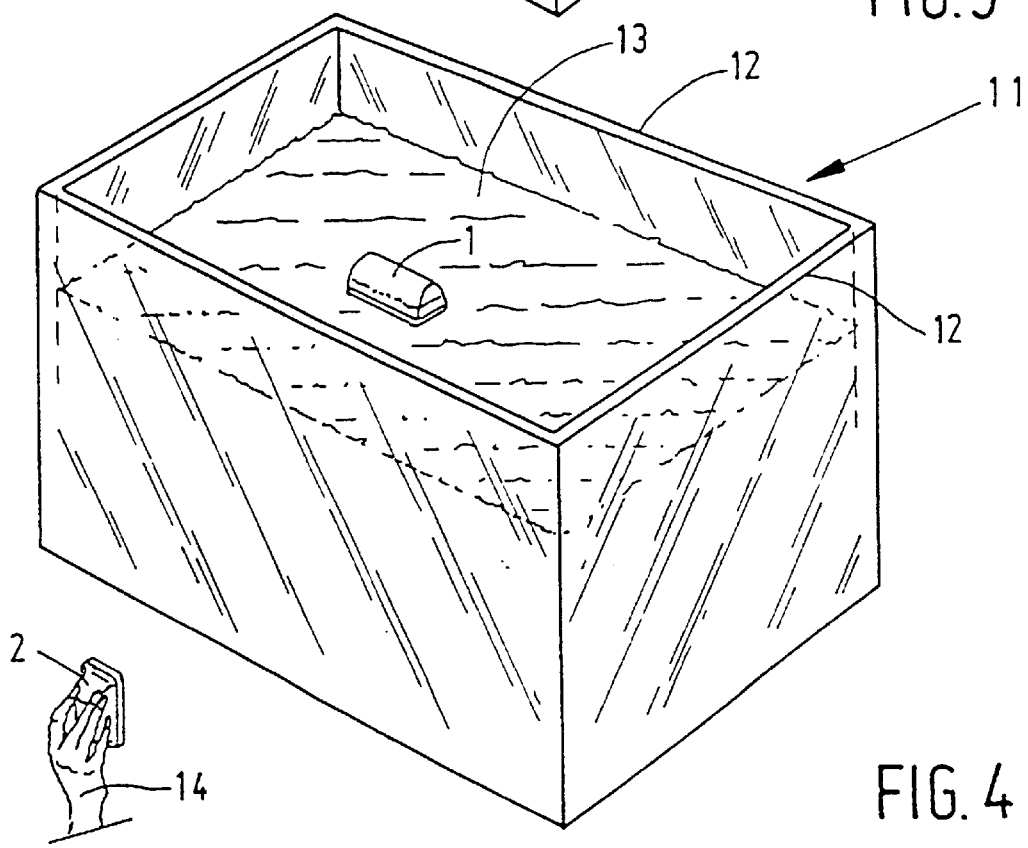
FIG. 4 schematically shows the situation wherein the magnetic contact between the interior element of FIG. 1 and the exterior element of FIG. 2 is broken.

FIGS. 3 and 4 schematically show the method according to the present invention. In practice, aquarium 11, which has upright edges 12 made of a transparent material, such as glass, and which is filled with a liquid medium 13, for example water, will exhibit a deposit on the inside of the aquarium window 11 after some time. Such a deposit, which is generally caused by algal growth, is considered to be objectionable because it leads to a reduced transparency of the upright edges 12. For the sake of simplicity, the apparatus usually present in an aquarium, such as pumps and a purifying element, water plants, fish and the like are not shown in aquarium 11. The interior element 1 is placed on the water surface 13, after which the exterior element 2 is brought into contact, preferably manually, with the upright edge 12, for example with the schematically indicated hand 14. Due to the magnetic force between interior element 1 and exterior element 2, element 1 will be drawn to the upright edge 12 and a connection, as schematically shown in FIG. 3, will be made. When exterior element 2 is moved forwards and backwards on the outside of the upright edge 12, the element 1 to be placed on the inside of the aquarium window will follow these movements under the influence of the prevailing magnetic force between interior element 1 and exterior element 2, as a result of which the inside of the aquarium window or the upright edge 12 will be cleaned. The special geometric shape of segment 3 of interior element 1 makes it easy for the interior element to move from one upright edge 12 to the other upright edge 12.

FIG. 4 schematically shows the situation in which there is no magnetic contact between interior element 1 and exterior element 2. The interior element 1 thus floats on the liquid surface without sinking to the bottom, unlike prior art window cleaners, which will indeed sink to the bottom. The magnetic contact between interior element 1 and exterior element 2 can now be easily restored by moving exterior element 2 near aquarium 11, so that element 1 will be drawn towards upright edge 12 under the influence of the magnetic force it experiences. This will lead to the situation as shown in FIG. 3 again. By making the interior element 1 to be placed on the inside of the aquarium window or upright edge 12 of such a material which is inert to the liquid medium 13, it is possible to leave interior element 1 permanently in aquarium 11, so that the aquarium window 12 can be cleaned at any desired moment merely by manipulating exterior element 2 near aquarium window 12.

Although the present invention is described herein as comprising an interior element 1 and an exterior element 2, it should be understood that the present invention is by no means limited to such a specific embodiment. Thus it is possible to interchange elements 1 and 2, so that element 1 or element 2 can be placed on the outside of the aquarium window, whereby it stands to reason that in such an embodiment the element which is placed inside the aquarium window will have buoyancy.

What is claimed is:

1. A device for cleaning an interior window surface of an aquarium comprising a buoyant floatable interior element and an exterior element, at least one element having at least one magnet and the other element having a material attracted to the at least one magnet wherein the elements attract to each other under the influence of a magnetic force between the elements so that movement of the exterior element along an exterior window surface of an aquarium causes the buoyant floatable interior element to move along an interior window surface of an aquarium and once the magnetic force between the elements has been removed, the buoyant floatable interior element afloats on a liquid medium present in the aquarium.

2. A device according to claim 1, wherein the buoyant floatable interior element includes an air chamber which gives the interior element buoyancy.

3. A device according to claim 1, wherein the buoyant floatable interior element includes a second material having a density lower than that of a liquid medium present in the aquarium.

4. A device according to claim 1, wherein the material on one element attracted to the at least one magnet on the other element comprises one or more magnets.

5. A device according to claim 1, wherein the exterior element includes the at least one magnet and the interior element includes the material attracted to the at least one magnet on the exterior element.

6. A device according to claim 1, wherein the interior element is provided with a rough surface.

7. A device according to claim 1, wherein the exterior element is provided with a smooth surface.

8. A device according to claim 7, wherein said smooth surface comprises a felt material.

9. A device for cleaning an interior window surface of an aquarium comprising a buoyant floatable interior element and an exterior element, each element having a magnet such that the elements attract each other under the influence of a magnetic force between the magnets so that movement of said exterior element along an exterior window surface of an aquarium causes said buoyant floatable interior element to move along an interior window surface of an aquarium and once the magnetic force between the magnets has been removed, the buoyant floatable interior element afloats on a liquid medium present in the aquarium.

10. A method for cleaning an interior window surface of an aquarium comprising the steps of:
   a) providing a buoyant floatable interior element and an exterior element, at least one element having at least one magnet and the other element having a material attracted to the at least one magnet;
   b) placing the exterior element on an exterior window surface of the aquarium and the interior element on an interior window surface of the aquarium, such that the elements attract one another under the influence of a magnetic force therebetween;
   c) moving the exterior element along the exterior window surface of the aquarium, thereby causing movement of the buoyant floatable interior element across the interior window surface of the aquarium as a result of the magnetic force between the elements wherein the movement of the buoyant floatable interior element along the interior window surface cleans the interior window surface of the aquarium; and
   d) removing the magnetic force between the elements such that the buoyant floatable interior element floats to the surface of a liquid medium within the aquarium.

\* \* \* \* \*